United States Patent
Wang et al.

(10) Patent No.: US 6,922,522 B2
(45) Date of Patent: Jul. 26, 2005

(54) HEAT TREATMENT APPARATUS, CALIBRATION METHOD FOR TEMPERATURE MEASURING SYSTEM OF THE APPARATUS, AND HEAT TREATMENT SYSTEM

(75) Inventors: Wenling Wang, Shiroyama-Machi (JP); Koichi Sakamoto, Shiroyama-Machi (JP); Fujio Suzuki, Shiroyama-Machi (JP); Takashi Yokota, Shiroyama-Machi (JP)

(73) Assignee: Tokyo Electron Limited, Tokyo-To (JP)

( * ) Notice: Subject to any disclaimer, the term of this patent is extended or adjusted under 35 U.S.C. 154(b) by 277 days.

(21) Appl. No.: 10/611,908

(22) Filed: Jul. 3, 2003

(65) Prior Publication Data
US 2004/0005147 A1 Jan. 8, 2004

Related U.S. Application Data

(62) Division of application No. 09/909,861, filed on Jul. 23, 2001, now Pat. No. 6,622,104.

(30) Foreign Application Priority Data
Jul. 24, 2000 (JP) ...................................... 2000-222233

(51) Int. Cl.⁷ ................................................ H05B 1/02
(52) U.S. Cl. ..................... 392/416; 392/418; 219/390; 219/405; 219/411; 219/494; 118/724; 118/725; 118/50.1; 367/477; 367/557

(58) Field of Search .................................. 219/390, 405, 219/411, 494; 392/416, 418; 118/724, 725, 50.1; 367/477, 557

(56) References Cited

U.S. PATENT DOCUMENTS

| | | | |
|---|---|---|---|
| 4,635,182 A | | 1/1987 | Hintz |
| 5,377,126 A | * | 12/1994 | Flik et al. .................... 700/300 |
| 5,517,594 A | | 5/1996 | Shah et al. |
| 5,740,033 A | | 4/1998 | Wassick et al. |
| 5,895,596 A | * | 4/1999 | Stoddard et al. ............ 219/497 |
| 5,994,675 A | * | 11/1999 | Bethune et al. ............. 219/483 |
| 6,492,625 B1 | * | 12/2002 | Boguslavskiy et al. ..... 219/486 |

\* cited by examiner

Primary Examiner—Shawntina Fuqua
(74) Attorney, Agent, or Firm—Smith, Gambrell & Russell, LLP

(57) ABSTRACT

A heat treatment apparatus has a controller (100) provided with a temperature estimator (110) for estimating a temperature of a wafer by detection signals of temperature sensors (Sin, Sout) and a temperature calibrator (120) for correcting the estimated temperature of the wafer. In order to calibrate the temperature, an offset value stored in an offset table (122) is used. The offset value is determined based on the relationship between film-thickness of films formed in an experimental heat treatment process and process temperatures.

7 Claims, 7 Drawing Sheets

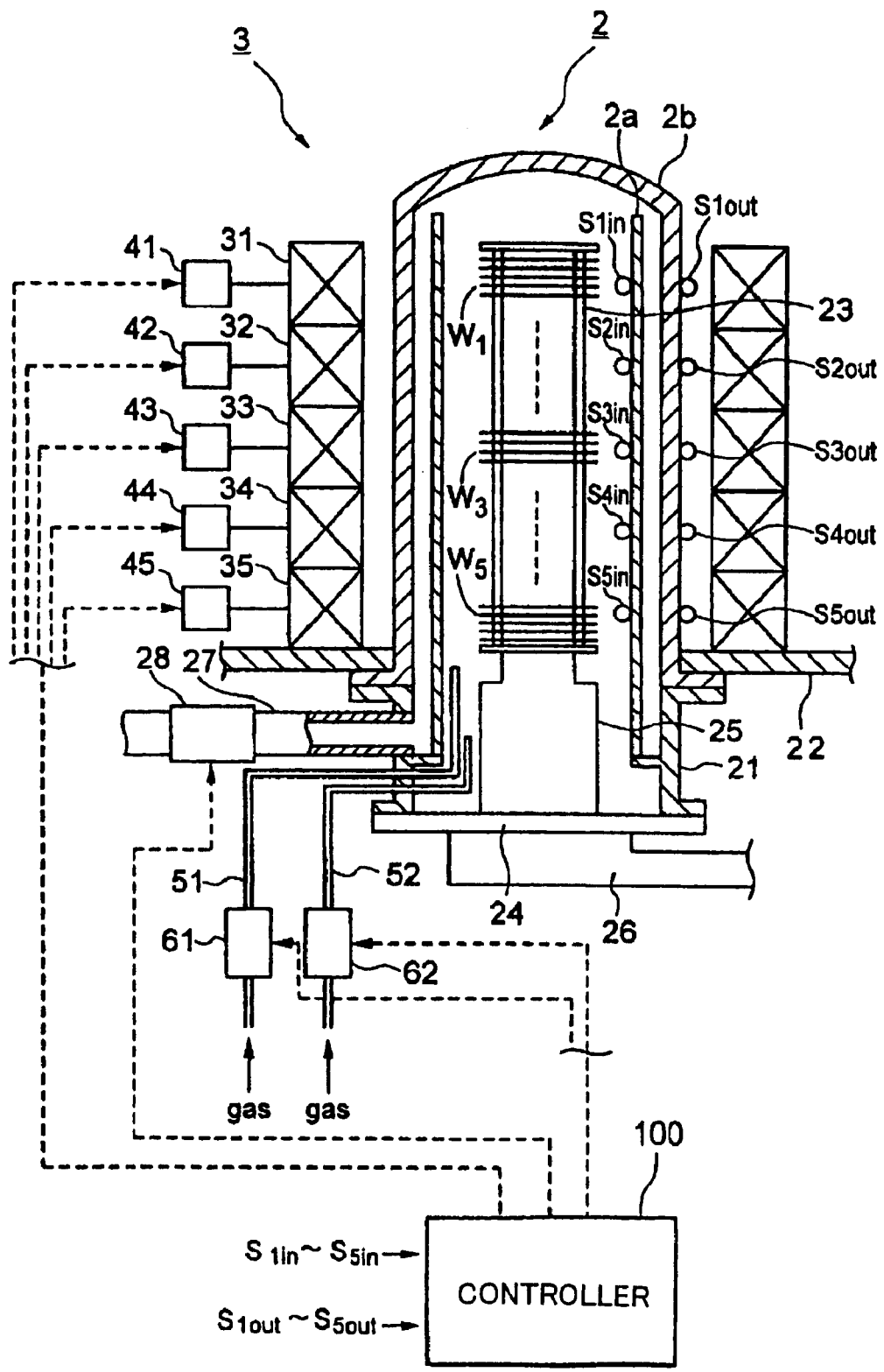
F I G. 1

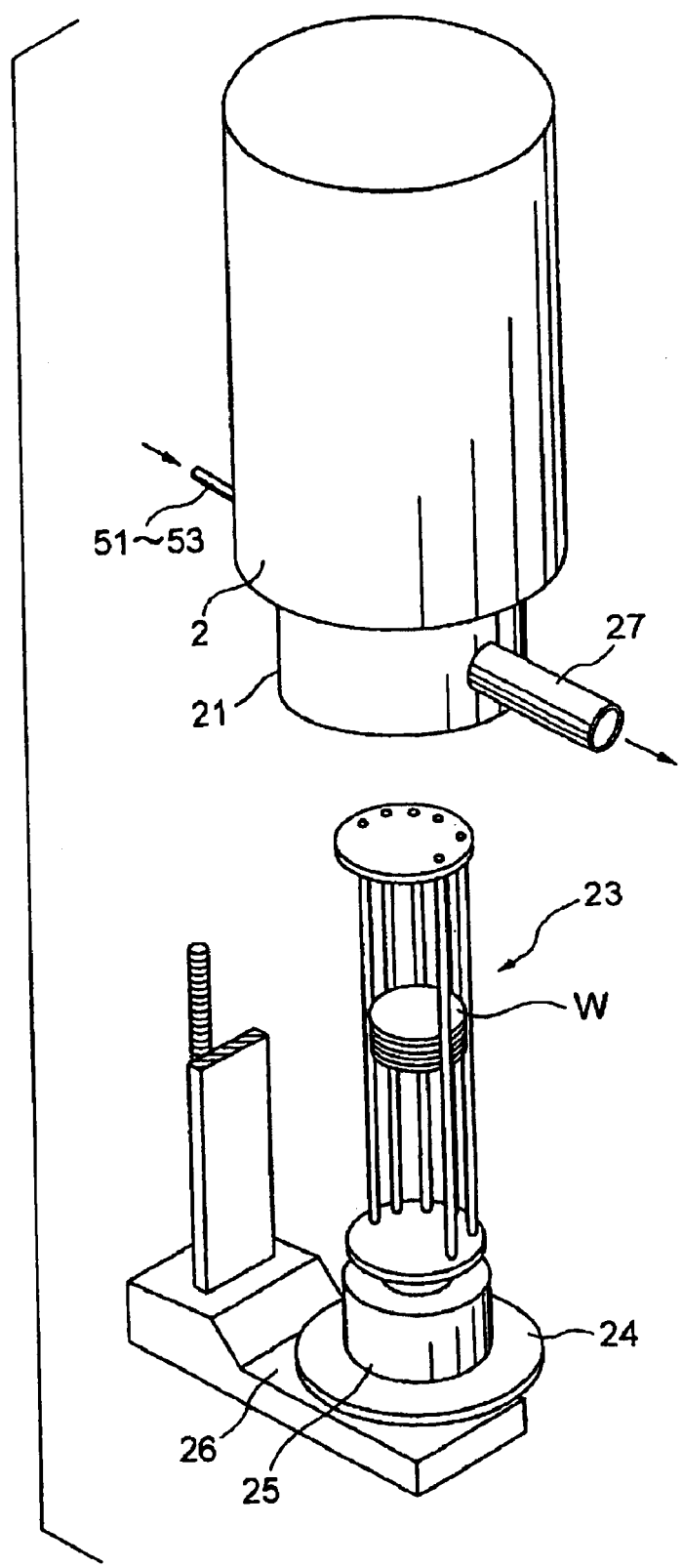
F I G. 2

HEAT TREATMENT APPARATUS, CALIBRATION METHOD FOR TEMPERATURE MEASURING SYSTEM OF THE APPARATUS, AND HEAT TREATMENT SYSTEM

CROSS REFERENCE TO RELATED APPLICATION

This application is a division of Ser. No. 09/909,861, filed Jul. 23, 2001, now U.S. Pat. No. 6,622,104, and which is being incorporated in its entirety herein by reference.

BACKGROUND OF THE INVENTION

1. Technical Field of the Invention

The present invention relates to a heat treatment apparatus, a calibration method for temperature measuring system of the heat treatment apparatus, and a heat treatment system.

2. Description of the Related Art

A vertical heat treatment apparatus, which performs a batch-type process on semiconductor wafers (which will be hereinafter referred to as "wafer(s)"), is known as one of the heat treatment apparatuses that performs a heat treatment on the wafers in a semiconductor device fabricating process. When performing the heat treatment, many wafers are carried by a wafer boat at intervals in the vertical direction and loaded into a reaction tube where the heat treatment, such as CVD process or oxidation process, is applied on the wafers.

Temperatures of the wafers have a great influence on the results of heat treatment. For instance, in case of film-deposition by the CVD process, a film-thickness changes depending on the temperatures of wafers. Accordingly, the temperatures of wafers during the heat treatment have to be controlled precisely. To this end, an accurate temperature measurement is necessary.

In a single-wafer heat treatment apparatus, the wafer is mounted face-to-face on a wafer table called a "susceptor". Accordingly, the temperature of the susceptor becomes generally equal to a temperature of the wafer mounted thereon. Thus, it is possible to obtain the temperature of the wafer with high accuracy by measuring the temperature of the susceptor via the use of a thermoelectric couple embedded therein. However, in the vertical heat treatment apparatus, where a plurality of wafers are held by the wafer boat to be simultaneously processed, a temperature sensor must be arranged remote from the wafers.

Therefore, in the midst of changing the temperature in the reaction tube, there exists a difference between the temperature detected by the temperature sensor and the actual temperatures of the wafers.

In order to measure the temperatures of the wafers with high accuracy, the temperature measurement has to be performed after the temperature in the reaction tube has been stabilized. This means a reduction in throughput of the apparatus.

In order to solve such a problem, there have been temperature measuring methods recently developed, taking the transitional response into consideration. U.S. Pat. No. 5,517,594, for example, discloses such method.

In the method disclosed therein, the temperature measurement is executed by using ARX model. The constant matrixes in the ARX model are determined, upon actual experiments, based on detection signals from thermoelectric couples arranged in the reaction tube, detection signals from thermoelectric couples directly attached to test wafers and electric power supplied to heaters.

However, this method involves the following problems. First, the use of wafer with the thermoelectric couple might cause metals of the thermoelectric couple to be dispersed into the reaction tube, thereby causing it to be contaminated. Therefore, it is not preferable that the manufacturer of the heat treatment apparatus performs such experiments on the product apparatus to be supplied to the user. In this view, it is possible to perform an experiment for one of the apparatuses manufactured with the same specifications, and apply the model determined in said one of the apparatuses on the other apparatuses. However, even when manufactured with the same specifications, some variation will exist. Furthermore, after using the apparatus for a long term, a periodic change in the condition of the apparatus occurs.

Since the above method cannot cope with these problems sufficiently, there is a possibility of insufficient accuracy in determining the temperature.

SUMMARY OF THE INVENTION

Accordingly, the first object of the present invention is to improve the temperature measuring accuracy of the temperature measuring system of the heat treatment apparatus to be provided for the user.

The second object of the invention is to provide a method of calibrating the temperature measuring system of the heat treatment apparatus to be provided for the user.

In order to accomplish the above objectives, the present invention provides a heat treatment apparatus, which includes: a processing vessel defining a processing chamber for processing an object to be processed therein; a heater that heats the object; a thermal sensor arranged in the processing chamber; a temperature estimator that estimates a temperature of the object based on a detection signal from the thermal sensor; a temperature calibrator that corrects the temperature of the object estimated by the temperature, estimator thereby to obtain a calibrated temperature of the object; and a controller that controls an operation of the heater based on the calibrated temperature of the object. The present invention also provides a heat treatment apparatus which includes: a processing vessel defining a processing chamber for processing an object to be processed therein; a heater that heats the object; a thermal sensor arranged in the processing chamber; a temperature estimator that estimates a temperature of the object at an estimation time-point based on a detection signal from the thermal sensor, the temperature estimator estimating the temperature of the object at the estimation time-point based on detection signals from the thermal sensor at several time-points preceding the estimation time-point; a temperature calibrator that corrects the temperature of the object estimated by the temperature estimator thereby to obtain a calibrated temperature of the object; and a controller that controls an operation of the heater based on the calibrated temperature of the object.

Furthermore, the present invention provides heat treatment apparatus which includes: a processing vessel defining a processing chamber for processing an object to be processed therein; a heater that heats the object; a thermal sensor arranged in the processing chamber; a temperature estimator that estimates a temperature of the object based on a detection signal from the thermal sensor; a temperature calibrator that corrects the temperature of the object estimated by the temperature estimator thereby to obtain a calibrated temperature of the object, the temperature calibrator having an offset table storing an offset value representing a difference between the temperature of the object estimated by the temperature estimator and a true temperature of the object, and an offset value adding part that adds or subtracts the offset value to or from the temperature estimated by the temperature estimator; a controller that controls an operation of the heater based on the calibrated temperature of the object; and an offset-value calculator that calculates the offset value to be stored in the offset table, based on the temperature of the object estimated by the temperature estimator and the true temperature of the object.

According to the second aspect of the present invention, there is provided a method of calibrating a temperature-detection system of a second heat treatment apparatus among a first and the second heat treatment apparatuses each having a processing vessel, a heater that heats an object to be processed, a thermal sensor and a temperature estimator that estimates a temperature of the object based on a detection signal from the thermal sensor, said method includes: (a) a temperature estimator adjusting process having the steps of: heating an object for temperature measurement placed in the processing vessel of the first heat treatment apparatus by the heater and measuring a true temperature of the object; and adjusting the temperature estimators of the first and second heat treatment apparatuses based on a result of the measurement of true temperature of the object; (b) a first heat-treatment/film-thickness measuring process including: a first heat-treatment step of heat-treating a first object for heat-treatment arranged in the processing vessel of the first heat treatment apparatus having the temperature estimator, having been adjusted in the process (a), under a designated heat-treatment condition; and a first film-thickness measuring step of measuring a film-thickness of a film formed on the first object; (c) a second heat-treatment/film-thickness measuring process including: a second heat-treatment step of heat-treating a second object for heat-treatment arranged in the processing vessel of the second heat treatment apparatus having the temperature estimator, having been adjusted in the process (a), under a designated heat-treatment condition; and a second film-thickness measuring step of measuring a film-thickness of a film formed on the second object; and (d) an offset-value calculating process having the steps of: comparing the film-thickness of the first object measured in the first film-thickness measuring step with the film-thickness of the second object measured in the second film-thickness measuring step, and calculating an offset value for calibrating the temperature of the object estimated by the temperature estimator of the second heat treatment apparatus based on the result of the comparison.

Furthermore, the present invention provides a heat treatment system, which includes: a heat treatment apparatus having a processing vessel defining a processing chamber for processing an object to be processed therein, a heater that heats the object and a thermal sensor arranged in the processing chamber; and a control device connected to the heat treatment apparatus, the control device having a temperature estimator that estimates a temperature of the object based on a detection signal of the thermal sensor, a temperature calibrator that corrects the temperature of the object estimated by the temperature estimator and a controller that controls an operation of the heater based on a calibrated temperature of the object corrected by the temperature calibrator.

BRIEF DESCRIPTION OF THE DRAWINGS

FIG. 1 is a partial sectional view showing one embodiment of the vertical heat treatment apparatus according to the present invention;

FIG. 2 is a perspective view of the vertical heat treatment apparatus of FIG. 1;

DESCRIPTION OF THE PREFERRED EMBODIMENT

Figure 3:
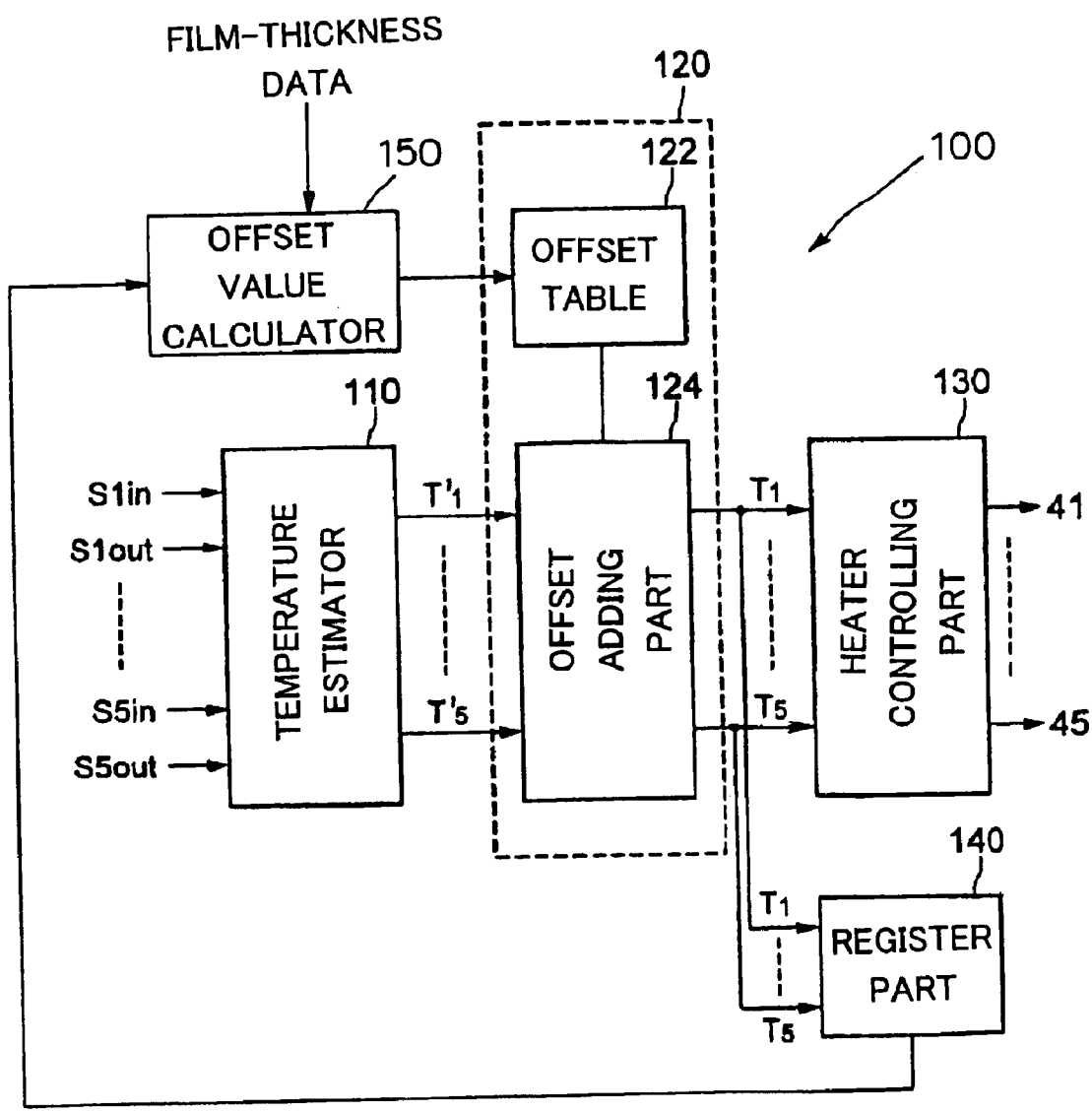
FIG. 3 is a block diagram showing the details of a controller of the vertical heat treatment apparatus of FIG. 1.

Referring to FIG. 1, the vertical heat treatment apparatus includes a double-tube type reaction tube 2 consisting of an inner tube 2a and an outer tube 2b both made of quartz. A cylindrical metal manifold 21 is arranged at the lower end of the reaction tube 2.

The top of the inner pipe 2a is open. The lower end of the inner pipe 2a is supported by the manifold 21. The top of the outer pipe 2b is closed. The lower end of the outer pipe 2b is connected to the top end of the manifold 21 in an airtight manner at a position under a baseplate 22.

Referring to FIG. 2, a wafer boat 23 is loaded into the reaction tube 2. On the wafer boat 23, there are horizontally mounted a large number, for example, 150 pieces of semiconductor wafers W (wafers as products) at intervals in the vertical direction. The wafer boat 23 is carried on a lid body 24 via a heat-insulating cylinder (insulating member) 25.

Wafers called "side wafers" are arranged on the uppermost and lowermost ends of the wafer boat 23 so that the product wafers W are subjected to uniform temperature. Wafers called "monitor wafers" for monitoring the processing condition are also arranged sparsely on the wafer boat 23.

For such arrangement of the wafers, the wafer boat 23 has a number of retaining grooves for simultaneously loading the side wafers and the monitor wafers in addition to the product wafers. For example, the wafer boat 23 for processing 150 pieces of product wafers W has retaining grooves for 170 pieces of wafers.

The lid body 24 is mounted on a boat elevator 26, which is provided for loading and unloading the wafer boat 23 into and from the reaction tube 2. At the upper limit position of the lid body 24, the lid body 24 closes up the lowermost opening of the manifold 21, that is, the lowermost opening of a processing vessel formed by the reaction tube 2 and thee manifold 21.

A heater 3 is provided around the reaction tube 2. The heater 3 has a plurality of (in this embodiment, five) heater elements 31 to 35 arranged in the vertical direction. Zones of the reaction tube 2 corresponding to the heater elements 31 to 35 will be called "zones 1 to 5", respectively. Calorific powers of the heater elements 31 to 35 are independently controlled by power controllers 41 to 45, which correspond to the heater elements 31 to 35, respectively.

Internal temperature sensors $S1_{in}$ to $S5_{in}$ are arranged on the inner wall of the inner tube 2a, and correspond to the heater elements 31 to 35, respectively. External temperature sensors $S1_{out}$ to $S5_{out}$ are arranged on the outer wall of the outer tube 2b, and correspond to the heater elements 31 to 35, respectively. The temperature sensors may be thermoelectric couples. The internal temperature sensors $S1_{in}$ to $S5_{in}$ are positioned so as not to come into contact with the wafers.

A plurality of Internal temperature sensors. $S1_{in}$ to $S5_{in}$ and external temperature sensors $S1_{out}$ to $S5_{out}$ are arranged in a circumferential direction around the inner tube 2a and the outer tube 2b, although in the drawing only one of each sensor is shown. Thus, it is possible to measure the temperature distribution of the reaction tube 2 in both axial and circumferential directions.

Five pieces of monitor wafers W1 to W5 are loaded onto the wafer boat 23 at respective positions corresponding to the heater elements 31 to 35. Normally, wafers identical to the product wafers (semiconductor wafers) are used as the monitor wafers W1 to W5.

The manifold 21 is provided with a plurality of gas supply pipes for supplying gas into the inner pipe 2a. For simplification of the drawing, only two gas supply pipes 51, 52 are shown in FIG. 1. Mass flow controllers 61, 62 for controlling respective gas flows and valves (not shown) are interposed in the gas supply pipes 51, 52, respectively.

Connected to the manifold 21 is an exhaust pipe 27, which opens into a space between the inner pipe 2a and the outer pipe 2b. The exhaust pipe 27 is connected to a vacuum pump (not shown). A pressure regulator 28 is interposed in the exhaust pipe 27 to adjust the pressure in the reaction tube 2. The pressure regulator 28 includes a butterfly valve, a valve actuator and so on.

The vertical heat treatment apparatus is equipped with a controller 100 for controlling processing parameters, for example, the temperature of the processing atmosphere in the reaction tube 2, pressure in the reaction tube 2, flow rate of gas, etc. Detection signals from the temperature sensors $S1_{in}$ to $S5_{in}$, and $S1_{out}$ to $S5_{out}$ are inputted into the controller 100. The controller 100 outputs respective control signals to the power controllers 41 to 45, the pressure regulator 28 and also the flow controllers 61, 62.

Next, the controller 100 will be described in detail. FIG. 3 is a block diagram showing the details of parts in connection with the control of the heater 3 by the controller 100. The controller 100 has a temperature estimator 110, a temperature calibrator 120, a heater controlling part 130, a register part 140 and an offset-value calculating part 150.

The temperature estimator 110 outputs estimated temperatures T1' to T5' of the monitor wafers W1 to W5 estimated based on the detection signals received from the temperature sensors $S1_{in}$ to $S5_{in}$, and $S1_{out}$ to $S5_{out}$. The temperature estimation in the temperature estimator 110 is carried out based on the detection signals at several points of time in the past.

The temperature calibrator 120 calibrates the estimated temperatures T1' to T5' estimated by the temperature estimator 110, and further outputs calibrated temperatures T1 to T5 of the monitor wafers W1 to W5. The temperature calibrator 120 includes an offset table 122, which stores offset values OF1 to OF5 for calibrating the estimated temperatures T1' to T5' of the monitor wafers W1 to W5, respectively. The temperature calibrator 120 also includes an offset-value adding part 124, which adds or subtracts the offset values OF1 to OF5 to or from the estimated temperatures T1' to T5', respectively.

The heater controlling part 130 outputs control signals to the power controllers 41 to 45 based on the calibrated temperatures T1 to T5 calibrated by the temperature calibrator 120.

The register part 140 can record the calibrated temperatures T1 to T5 together with their detection times, and also store the temperatures as a log representing the operative condition of the heat treatment apparatus.

The offset-value calculating part 150 functions to calculate the offset values OF1 to OF5.

Figure 4:
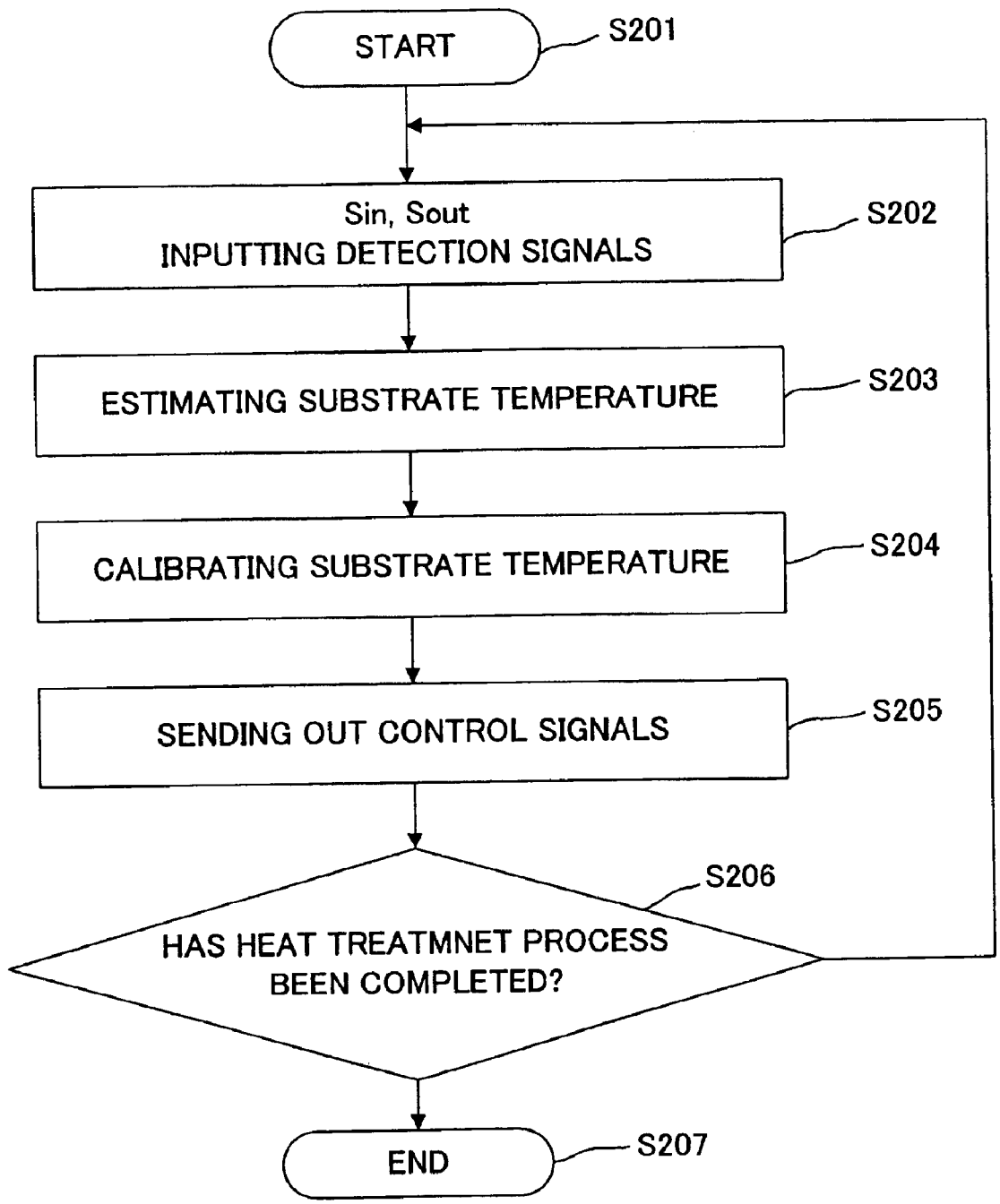
FIG. 4 is a flow chart showing respective control steps executed by the controller of FIG. 3

FIG. 4 is a flow chart representing the control sequence of the controller 100 for the heater 3. The sequence of temperature-control steps will be described with reference to this flow chart.

When the heat treatment process is started (S201), the detection signals of the temperature sensors $S1_{in}$ to $S5_{in}$, and $S1_{out}$ to $S5_{out}$ are read by the temperature estimator 110 (S202).

The temperature estimator 110 calculates the respective estimated temperatures T1' to T5' of the monitor wafers W1 to W5 based on the detection signals received from the temperature sensors $S1_{in}$ to $S5_{in}$, and $S1_{out}$ to $S5_{out}$ (S203). In this estimation, the following equations (1) and (2), which are known in control engineering, may be used:

$$x(t+1)=A*x(t)+B*u(t) \tag{1}$$

$$y(t)=C*x(t)+u(t) \tag{2}$$

wherein, t: time, x(t): n-dimensional state vector, y(t): m-dimensional output vector, u(t): r-dimensional input vector, and A, B, C are constant matrixes of n×n, n×r and m×n, respectively.

The equation (1) is called "equation of state", the equation (2) is called "output equation". By solving the simultaneous equations (1) and (2), it is possible to obtain the output vector y(t) corresponding to the input vector u(t).

In this embodiment, the input vector u(t) represents the detection signals from the temperature sensors $S1_{in}$ to $S5_{in}$ and $S1_{out}$ to $S5_{out}$, and the output vector y(t) represents the estimated temperatures T1' to T5'. The estimated temperatures T1' to T5' are estimated based on the detection signals obtained at several points of time in the past.

In the equations (1) and (2), the detection signals of the temperature sensors $S_{in}$ and $S_{out}$ and the estimated temperatures T1' to T5' have a relationship of multi-inputs and multi-outputs. In detail, each of the heater elements 31 to 35 does not have an influence on the only one of the monitor wafers W1 to W5 positioned in the corresponding zones, but each of the heater elements 31 to 35 affects all of the monitor wafers W1 to W5.

Upon considering the noise factor, the following equations (3) and (4) may be used instead of the aforementioned equations:

$$x(t+1)=A*x(t)+B*u(t)+K*e(t) \tag{3}$$

$$y(t+1)=C*x(t)+D*u(t)+e(t) \tag{4}$$

wherein, t: time, x(t): n-dimensional state vector, y(t): m-dimensional output vector, u(t): r-dimensional input vector, and e(t): m-dimensional noise vector, and A, B, C, D and K are constant matrixes of n×n, n×r, m×m and n×m, respectively.

If the combination of constant matrixes A, B, C and D is determined, it is possible to calculate the estimated temperatures T1' to T5' from the detection signals from the temperature sensors $S1_{in}$ to $S5_{in}$, and $S1_{out}$ to $S5_{out}$, by solving the simultaneous equations (1) and (2) or the simultaneous equations (3) and (4). The method of determining the constant matrixes A, B, C and D will be described later.

Next, the temperature calibrator 120 calculates the calibration temperatures Ti of the monitor wafers Wi (W1 to W5) (S204).

The calibration temperatures Ti of the monitor wafers Wi can be calculated by, for example, the following equation:

$$Ti = Ti' + Ofi \quad (5)$$

wherein, i: index representing the number of monitor wafer (i=1 to 5);

Ti': estimated temperature of the monitor wafer Wi; and

OFi: temperature offset value of the monitor wafer Wi

The temperature offset value OFi is selected from values stored in the offset table 122.

The heater controlling part 130 calculates the required power outputs h1 to h5 to be supplied to the heater elements 31 to 35 based on the calibrated temperatures Ti, and sending the values h1 to h5 as control signals to the power controllers 41 to 45 (S205), thereby calorific powers of the heater elements 31 to 35 are controlled.

If the heat treatment process has not been completed, the routine returns to step S202, and the temperature control for the semiconductor wafer W is thus continued (S206, S207).

Steps S202 to S206 are repeated in a cycle of about 1 to 4 seconds. The estimation in temperatures of the wafers is carried out based on the past record of the detection signals of the temperature sensors $S_{in}$ to $S_{out}$, which have been obtained in the cycle of about 1 to 4 seconds.

Figure 5:
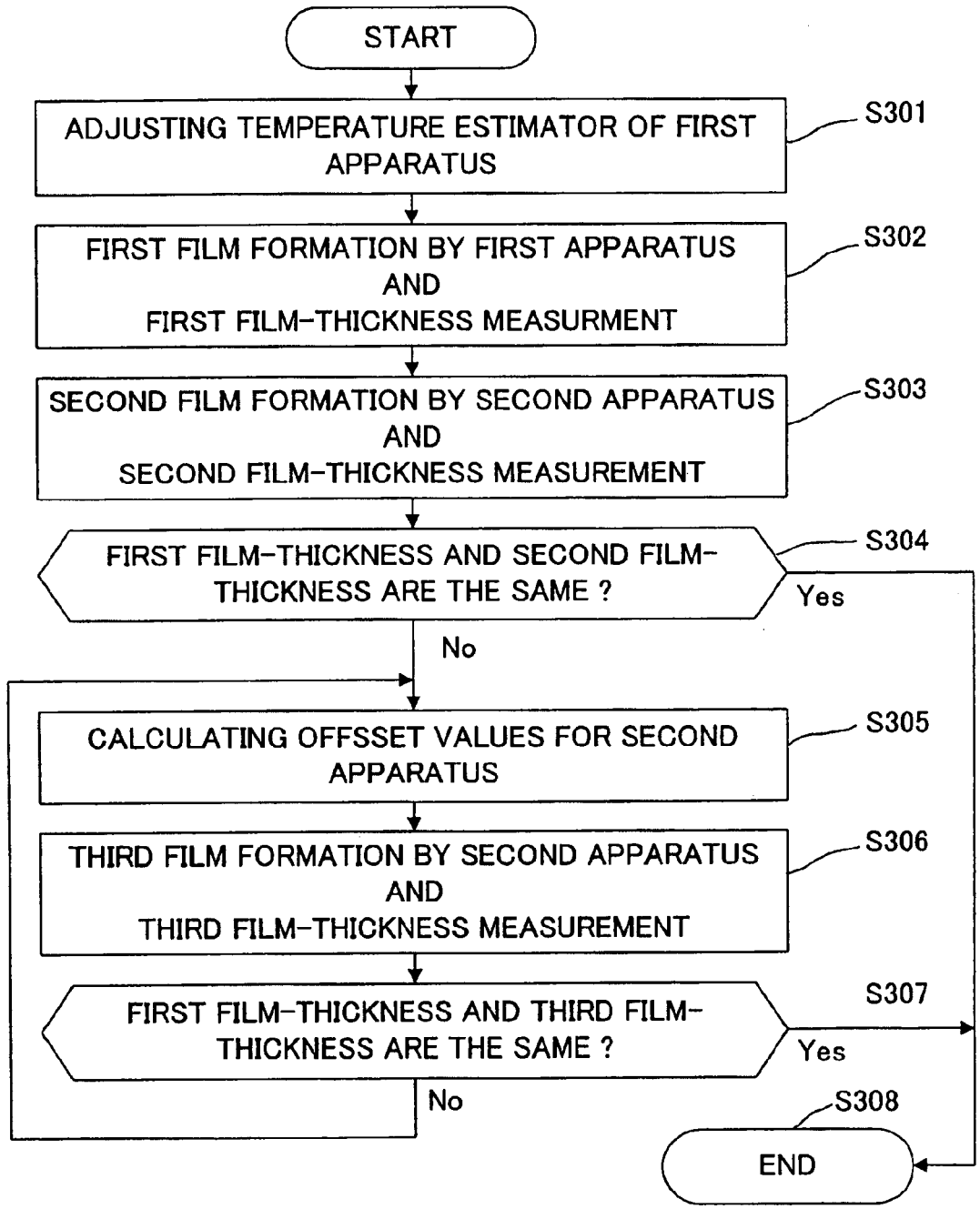
FIG. 5 is a flow chart for explanation of the calibrating method performed by a temperature measuring device.

Next, the adjustment of the temperature-control system in the heat treatment apparatus of FIG. 1 will be described with reference to FIG. 5. The following adjusting method is convenient for adjusting a plurality of heat treatment apparatuses produced under the same specification. In the following description, the first heat treatment apparatus may be called "standard (parent) heat treatment apparatus" which the manufacturer of the apparatus possesses, and the second heat treatment apparatus may be called "product (child) heat treatment apparatus" which is to be provided for the user.

First, the monitor wafers W1 to W5, to which the thermoelectric couples are attached, are subjected to the heat treatment by the first heat treatment apparatus. During the heat treatment, time variation of the actual temperatures T1m to T5m of the monitor wafers W1 to W5 and detection signals of the temperature sensors $S1_{in}$ to $S5_{in}$, and $S1_{out}$ to $S5_{out}$ are measured simultaneously.

The adjustment for the temperature estimator 110 of the first heat treatment apparatus is carried out by determining the constant matrixes A, B, C and D in the aforementioned equations (3) and (4). The constant matrixes A, B, C and D are dependant on the heat-characteristics of the heat treatment apparatus.

As one concrete method for determination, "subspace method" is applicable for the determination of the constant matrixes. Specifically, the constant matrixes A, B, C and D can be determined upon processing data of the detection signals of the temperature sensors $S1_{in}$ to $S5_{in}$, and $S1_{out}$ to $S5_{out}$ and the actual temperatures T1m to T5m of the monitor wafers W1 to W5 by using the software "Matlab" (provided by The MathWork Inc. and sold by Cybernet System Co. Ltd.).

In general, a plurality of combinations of the constant matrixes A, B, C and D thus obtained exist. Then, one of the combinations, by which the estimated temperatures T1' to T5' calculated by using the equations (3) and (4) coincide with the actually-detected temperatures T1*m* to T5*m*, is selected. When determining the constant matrixes, all of the offset values OFi are set to be zero. In other words, the constant matrixes A, B, C and D, by which the estimated temperatures T1' to T5' coincide with the actual temperatures T1m to T5m, are determined without using the offset values OFi.

The equations (3) and (4) containing the constant matrixes A, B, C and D on determination, in other words, a program for calculating the estimated-temperatures T1' to T5' of the monitor wafers W1 to W5 based on the detection signals of the temperature sensors $S1_{in}$ to $S5_{in}$, and $S1_{out}$ to $S5_{out}$ by means of the equations (3) and (4), is stored in the temperature estimator 110-1 of the first heat treatment apparatus. The same program is stored in the temperature estimator 110-2 of the second heat treatment apparatus. Thereupon, step S301 is completed.

Next, the process wafers W1-1 to W5-1 (the first objects for heat treatment) are loaded in the first heat treatment apparatus, and are processed under a predetermined heat-treatment condition (standard process recipe). Then, the thickness of film formed on each of the first objects for heat treatment is measured (S302).

The term "process wafer" means a wafer identical to the product wafer. The process wafers are loaded on the wafer boat 23, at the same positions as the product wafers. Since the process wafers W1-1 to W5-1 are identical to the product wafers W, the films formed on the process wafers are the same as those formed on the product wafers W under the same film forming condition.

Figure 6:
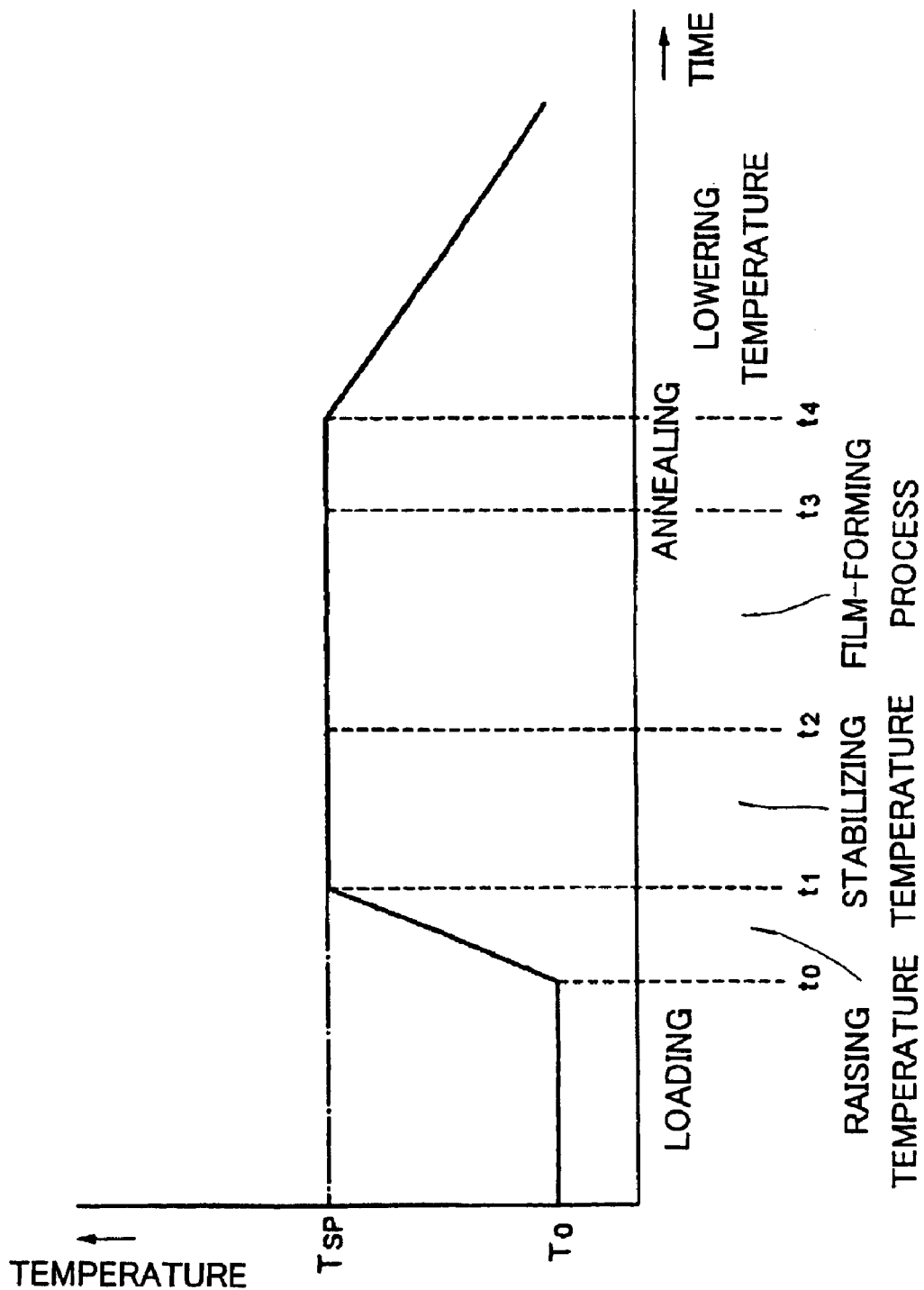
FIG. 6 is a chart diagram showing one example of a heat treatment condition used in the calibration method.

FIG. 6 shows an example of heat-treatment condition for the process wafers W1-1 to W5-1. Preferably, this heat-treatment condition is the same as the heat-treatment condition to be actually used by the user. It is also preferable that temperature (set temperature) is substantially constant during the film forming process so as to clarify relationship between the film-thickness and the temperature. Of course, the heat treatment condition is preferably set so that the process wafers W1-1 to W5-1 are processed under the same condition.

At a stable temperature T0, the process wafers W are loaded into the heat treatment apparatus. In a period from time $t_0$ to time $t_1$, the objects for the heat treatment are heated up to a set temperature Tsp (temperature raising process). Thereafter, the objects are left in the apparatus till time $t_2$ in order to stabilize the temperature of the objects (stabilizing process). In a period from time $t_2$ to time $t_3$, gas, for example, such as $SiH_2Cl_2$-gas and $NH_3$-gas, is introduced from the gas supply pipes 51, 52 thereby to form SiN-film on the process wafers W1-1 to W5-1 at the set temperature Tsp (film-forming process). Thereafter, the introduction of gas is stopped at time $t_3$ and the process wafers W1-1 to W5-1 are annealed till time $t_4$ (annealing process). Next, the temperature of the process wafers is lowered (temperature lowering process) to unload the process wafers W1-1 to W5-1 from the apparatus.

The thickness of the film formed on each of the process wafers W1-1 to W5-1, having been subjected to the film-forming process, are measured by a film-thickness inspecting unit, such as eliptho-meter.

Typically, the above steps S301 and S302 are performed in a manufacturer's factory for the vertical heat treatment apparatus. While, the following processes (from process (c)) are typically performed in the user's semiconductor-device manufacturing factory where the vertical heat treatment apparatus is installed, by a serviceman of the manufacturer or an operator on the user's side.

Next, the process wafers W1-2 to W5-2 (the second objects for heat treatment) are loaded in the second heat treatment apparatus to be calibrated, and are processed under the same heat-treatment condition as that in the process (B). Then, the thickness of film formed on each of the process wafers W1-2 to W5-2 is measured (S303).

It should be noted that "the same heat-treatment condition" in the above description means that the conditions in terms of at least, set temperature, sort of gas, gas pressure or the like are the same during the film-forming process. The process wafers W1-2 to W5-2 are loaded on the wafer boat 23 at the same positions as those of the process wafers W1-1 to W5-1 in the above process (B).

As mentioned before, the second heat treatment apparatus is fabricated under the same specification as that of the first heat treatment apparatus. The temperature estimator 110-2 of the second heat treatment apparatus has a temperature-estimating program stored therein, which is identical to that stored in the temperature estimator 110-1 of the first heat treatment apparatus. The first apparatus and the second apparatus are identical to each other in terms of the constant matrixes A, B, C and D of the equations (1), (2) or equations (3), (4). In addition, at a point of time executing step S303, the offset values OFi are set to be zero.

When the thickness of each film to be formed at step S302 is thin, for example, less than 10 nm, it is preferable that the heat-treatment condition in the second heat treatment apparatus is the same as that at step S302 regarding not only the film-forming process but also other processes (temperature raising process, stabilizing process, annealing process, etc.).

This is because such processes, except for the film-forming process, might affect the thickness of the deposited films. For example, it is possible that an extremely thin film is formed in processes other than the film-forming process due to the presence of residual gas.

The thickness of the film formed on each of the process wafers W1-2 to W5-2, having been subjected to the film-forming process, is measured by a film-thickness inspecting unit, such as eliptho-meter.

Next, the film-thickness measured at step S302 is compared with that measured at step S303 to judge whether or not the difference in thickness therebetween is within an allowable range (range of the order of measuring errors) (S304). This judgment is carried out for each of the process wafers W1-2 to W5-2.

If the difference in film-thickness between the process wafer Wi-1 and the process wafer Wi-2 is within the allowable range (for example, less than 0.1% of a target film-thickness), then the offset value OFi can be set to be zero. It means that the individual difference between the first heat treatment apparatus and the second heat treatment apparatus is substantially negligible. If the judgments for all of the process wafers W1-2 to W2-5 are "Yes", then all of the offset values OFi are set to be zero. Thereupon, the calibration of the second heat treatment apparatus is completed (S308).

If the judgment at step S304 is "No", then it is executed to calculate the temperature-offset value OFi in the second heat treatment apparatus, based on a difference in film-thickness between the process wafer Wi-1 and the process wafer Wi-2 (S305).

Both the second and first heat treatment apparatuses perform the heat treatment at the same set temperature Tsp. In the second treatment apparatus, the controller 100 controls the operation in a manner that the estimated-temperature Ti' of the process wafer Wi coincides with the set temperature Tsp. Accordingly, the presence of a difference in film-thickness between the process wafer Wi-2 and the process wafer Wi-1 means that the temperature of the process wafer Wi-2 in the second heat treatment apparatus is slightly different from that the temperature of the process wafer Wi-1 in the first heat treatment apparatus. The temperature estimator 110-1 of the first heat treatment apparatus has been already adjusted at step S301. Accordingly, it is concluded that this difference in film-thickness is derived from measuring errors in temperature of the second heat treatment apparatus, due to the individual difference between the first and second apparatuses. The correction of measuring errors is accomplished by determining an appropriate offset value OFi in the second heat treatment apparatus.

The offset value OFi can be calculated by using a relationship between change in film-thickness and change in temperature, for example, a film-thickness/temperature coefficient. The film-thickness/temperature coefficient will be described as follows.

Regarding film forming reaction (for example, by CVD process) in which the reaction rate is limited by the reaction rate at the surface of the film (namely, "surface reaction rate limited reaction", i.e., a reaction where the reaction rate is limited by the surface reaction rate), it is known that a film-growth rate (deposition rate) V can be expressed by the following logical formula (6):

$$V = C^* \exp(-Ea/(kT)) \tag{6}$$

wherein, C: process constant (constant determined by film-forming process);

Ea: activation energy (constant determined by the sort of film-forming process);

k: Boltsman constant; and

T: absolute temperature

Upon partial-differentiating the formula (6) by temperature T, the following equation (7) is obtained:

$$\{\delta V/\delta T\}/V = (Ea/(k^*T^2))[1/^\circ C.] \tag{7}$$

In the above equation, $\{\delta V/\delta T\}/V$ is the film-thickness/temperature coefficient, which represents the change in deposition rate that depends on the change in temperature.

The activation energy depends on the sort of film-forming process (in this embodiment, SiN film forming process using $SiH_2Cl_2$ and $NH_3$ as reactive gases), and it is known that the activation energy is 1.8 [eV] in this embodiment. Upon substituting the activation energy Ea and absolute temperature T in the equation (7), the film-thickness/temperature coefficient $\{\delta V/\delta T\}/V$ can be obtained.

If the film-thickness of the process wafers Wi-1, Wi-2 processed by the first and second heat treatment apparatuses are represented by d1 and d2, respectively, and if the true temperatures of the wafers at that time are represented by T1, T2, respectively, the film-thickness/temperature coefficient $\{\delta V/\delta T\}/V$ is expressed by the following formula (8):

$$\{\delta V/\delta T\}/V = (d2-d1)/[d1^*(T2-T1)] \tag{8}$$

If the absolute temperature T in the equation (7) is the true wafer temperature T1, the following equation (9) can be derived from the equations (7) and (8):

$$T2 = T1 + [(d2-d1)/d1]^*[k^*T1^2/Ea] \tag{9}$$

Since the values of Ea, k, T1, d2 and d1 are known, it is possible to calculate the respective true temperatures Ti2 of the process wafers Wi-2 in the second heat treatment apparatus by replacing T2 with Ti2.

Then, the offset values OFi can be determined by using the following equation (10) based on the true wafer temperatures Ti2 and the estimated temperatures Ti2' (step S305).

$$OFi = Ti2 - Ti2' \tag{10}$$

The above-mentioned offset values OFi are calculated, based on the above equations, by the offset-value calculating part 150. In other words, the offset-value calculating part 150 obtains the calibrated temperature Ti2, namely, the estimated temperature Ti2', recorded in the register part 140. (Since the offset value OFi is set to be zero for the time being, the calibrated temperature Ti2 is equal to the estimated temperature Ti2'). The measured film-thickness is inputted into the offset-value calculating part 150. The offset-value calculating part 150 calculates the true wafer temperature Ti2 based on the measured film-thickness by the above equation and also calculates the offset value OFi based on the true wafer temperature Ti2 and the calibrated temperature Ti2.

The above explanation is made for the case that the film forming reaction is the "surface reaction rate limited reaction". However, if movement of substance in the film relates to the film growth (e.g., in case of forming a thermal oxidation film), it is possible that the film-growth rate depends on the film-thickness, and thus cannot be expressed by the equation (6).

In such a case, the film-thickness/temperature coefficient can be calculated similar to the case of the "surface reaction rate limited reaction", on condition that a theoretical relationship exists between film-thickness and time. For example, a theoretical formula exists, relating to the film-thickness of the thermal oxidation film, by Deal and Grove (see: Andrew S. Grove "Physics and Technology of Semiconductor Devices" 1967).

Here, it is assumed that the theoretical formula of film-thickness X0 is expressed by the following formula (11):

$$X0 = f(T, t) \tag{11}$$

wherein, f: theoretical functional equation of film-thickness layer;

T: absolute temperature; and t: time

Then, the film-thickness/temperature coefficient $\{\delta V/\delta T\}/V$ can be expressed by the following equation (12):

$$\{\delta V/\delta T\}/V = \{\delta^2 f(T, t)/\delta T \delta t\}/f(T, t) \tag{12}$$

When substituting the true wafer temperature T1 to the absolute temperature T of the equation (12), the offset value OFi can be introduced from the equations (8) and (12), as similar to the case of "surface reaction rate limited reaction".

Without using such a theoretical formula, the offset value OFi for the second heat treatment apparatus may be determined based on a film-thickness/temperature coefficient, which is calculated based on the result of the experiment, in which a films are formed on the process wafers Wi under the different process temperatures.

In this case, the film-thickness/temperature coefficient is determined by the following steps:

(i) A film is formed on a wafer W at a predetermined set temperature T1, and the thickness d1 of the film formed on the wafer W is measured.

In this step, the heat treatment process shown in FIG. 6 can be employed. During the heat treatment, it is preferable to set a stabilization time (t2–t1) to be as long as possible in order to ensure temperature stability and temperature uniformity over the surface of the wafer W during the film deposition process. It is desirable to exclude the possibility that the film is formed on the wafer W (e.g., by residual gas) in the processes other than the film-forming process. It is also desirable to form a film with sufficiently large thickness as compared with the film-thickness measuring accuracy.

(ii) A film is formed on a wafer W at a predetermined set temperature T2, and the thickness d2 of the film formed on the wafer W is measured.

In this step, the set temperature T2 is set to a value different from the temperature T1 by about 5° C. If the difference (T2–T1) in the set temperatures is too small, the difference (d2–d1) in film-thickness also becomes too small (as compared with the film-thickness measuring accuracy) to determine a sufficiently precise film-thickness/temperature coefficient. On the contrary, if the difference (T2–T1) in the set temperatures is too large, a problem arises due to the dependency of film-thickness/temperature coefficient on temperatures. Thus, the difference (T2–T1) in the set temperatures is not limited to a certain fixed value (e.g., 5° C.), and must be changed to achieve precise determination of the film-thickness/temperature coefficient.

In view of calculating an exact film-thickness/temperature coefficient, it is preferable that the heat-treatment conditions other than the above set temperature at this heat treatment step (ii) is set to be the same as those at the heat treatment step (i).

(iii) The film-thickness/temperature coefficient $\{\delta V/\delta T\}/V$ is calculated by the following formula (13):

$$\{\delta V/\delta T\}/V = (d2 - d1)/[d1 \cdot (T2 - T1)] \tag{13}$$

In the above way, the film-thickness/temperature coefficient can be obtained experimentally.

Next, the process wafers W1-3 to W5-3 (the third objects for heat treatment) are loaded in the second heat treatment apparatus, and are processed under the aforementioned heat-treatment condition (standard process recipe). The thickness of films formed on the process wafers W1-3 to W5-3 are measured (S306). The heat-treatment condition at this step is identical to that at step S302. During the heat treatment, the operation of the heat treatment apparatus is controlled based on the offset value OFi calculated at step S305.

The thickness of the film formed on each of the process wafers W1-3 to W5-3, having been subjected to the film-forming process, is measured by a film-thickness inspecting unit, such as an eliptho-meter.

Next, the film-thickness measured for each of the process wafers at step S306 is compared with that measured at step S302 to judge whether or not the difference in thickness therebetween is within an allowable range (S307). The offset value OFi calculated at step S305 is correct, if the difference in film-thickness between the process wafers Wi-1 and Wi-3, which are arranged at the corresponding positions of the wafer boat 23, is within the allowable range. If the judgments for all of the process wafers W1-3 to W5-3 are all "Yes", all the offset values OFi are correct. Thereupon, the calibration for the second heat treatment apparatus is completed (S308).

If the judgment at step S307 is "No", the routine returns to step S305 to calculate the offset value OFi. In this calculation, the film-thickness measured at step S306 may be used, as follows. It is assumed that the film-thickness of the process wafers Wi-3, Wi-2 and Wi-1 are d3, d2 and d1, respectively, and true temperatures of the wafers when such film-thickness d3, d2 and d1 are obtained are T3, T2 and T1, respectively. Then, based on the film-thickness of films on the process wafers Wi-3 and Wi-1, the film-thickness/temperature coefficient $\{\delta V/\delta T\}/V$ can be obtained by the following formula (14):

$$\{\delta V/\delta T\}/V = (d3 - d1)/[d1 \cdot (T3 - T1)] \tag{14}$$

Combining formula (14) with equation (8) results in the following equation (15):

$$(T3-T1)/(T2-T1)=(d3-d1)/(d2-d1) \qquad (15)$$

The following relationship exists among the true temperatures T3, T2, the respective estimated temperatures T3', T2' of the process wafers Wi-3, Wi-2 and the offset value OFi.

$$T3=T3'+OFi \qquad (16)$$

$$T2=T2'+OFi \qquad (17)$$

The equation obtained by substituting equations (16) and (17) to equation (15) involves only one unknown factor, i.e., the offset value Ofi. Thus, the offset value Ofi can be calculated.

According to the above, the offset value Ofi can be calculated based on the film-thickness measured at steps S302, S303 and S306, without requiring the theoretical equations (6), (11) or any preparatory experiments.

According to the above embodiment, there is no need to load any wafer equipped with thermoelectric couple in the apparatus, when calibrating the second heat treatment apparatus, which is to be provided to the user as a product (commodity). Therefore, it is possible to prevent the occurrence of contamination inside the second heat treatment apparatus (metal contamination due to the presence of the thermoelectric couple). In addition, the heat treatment apparatus is provided with the temperature estimator 110 and the temperature calibrator 120 independently of each other. The adjustment of the temperature estimator 110, which might cause the contamination inside the apparatus and which requires considerable time and complicated mathematical calculations, is carried out using the first heat treatment apparatus for the manufacturer's exclusive use. A simple test is carried out by using the second heat treatment apparatus having the temperature estimator 110 which is adjusted in the same condition as that of the first heat treatment apparatus. Then, the temperature calibrator 120 of the second heat treatment apparatus is adjusted based on the results of the test. Therefore, the user's adjustment operation for the apparatus can be accomplished easily.

Figure 7:
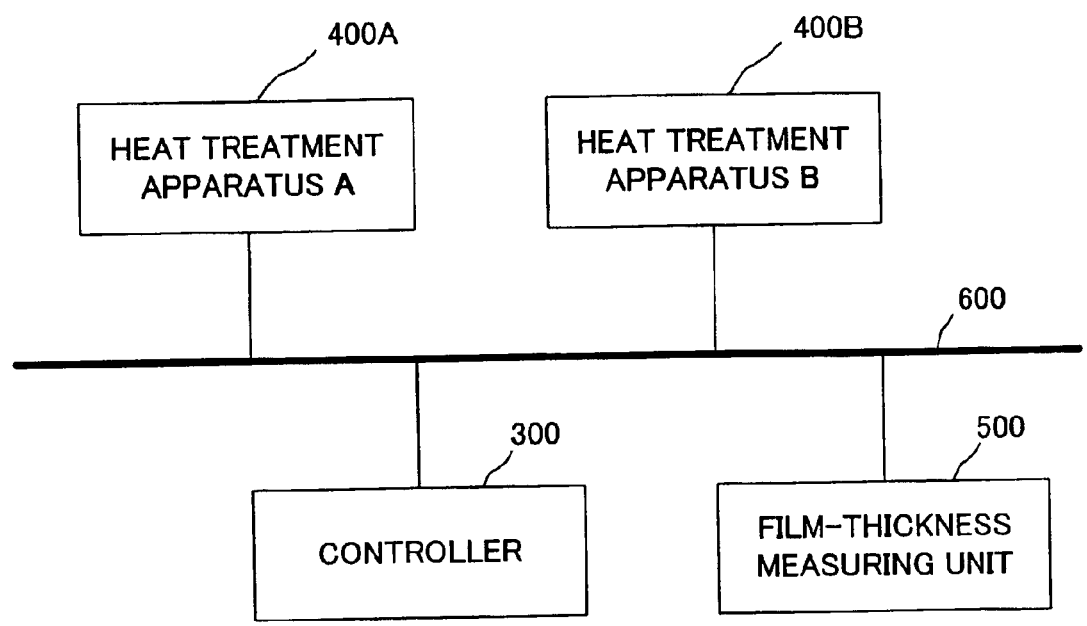
FIG. 7 is a block diagram showing a control system for the heat treatment apparatus of the present invention.

Next, another embodiment of the present invention will be described. FIG. 7 is a block diagram showing one embodiment of a control system for heat treatment apparatuses according to the present invention. Referring to FIG. 7, a control device 300, heat treatment apparatuses 400A, 400B and film-thickness measuring unit 500 are connected with each other through a network 600.

The structure of the control device 300 is similar to that of the controller 100 of FIG. 3. The structure of the heat treatment apparatuses 400A, 400B is the same as that of the heat treatment apparatus of FIG. 1 except that the apparatuses 400A, 400B are not equipped with the controller 100. The control device 300 includes the temperature estimator 110, the temperature calibrator 120, the heater controlling part 130 and the register part 140. The heat treatment apparatuses 400A, 400B each includes the reaction tube 2, the heater elements 31 to 35, the power controllers 41 to 45 and so on.

The plural heat treatment apparatuses 400A, 400B are controlled by the control device 300 through the network 600. Since the film-thickness measuring unit 500 is connected with the network 600, the results of measurement by the unit 500 can be transmitted to the control device 300 effectively. Therefore, the set of the offset values at the temperature calibrator 120 can be accomplished with a process-flow similar to that shown in the flow chart of FIG. 5, quickly and certainly.

In the modification, the control device 300 may be directly connected to the heat treatment apparatus 400A through no intermediary of the network 600. If this connection is detachable, then it is possible to alter the combination in connection between the control device 300 and the heat treatment apparatuses 400A, 400B, easily. Consequently, the respective controls of the plural heat treatment apparatuses 400A, 400B can be easily accomplished by the single control device 300.

Embodiments of the present invention are not limited to the aforementioned embodiments. The invention may be developed and modified within the scope of technical concept of the invention. For example, the objects to be processed are not limited to semiconductor wafers; the objects may be glass substrates. Without being limited to the vertical heat treatment apparatus or batch-type furnace, the invention is also applicable to a single-wafer heat treatment apparatus.

The purpose of heat treatment may be a diffusion process, annealing process, formation of thermal oxidation film and film-deposition (e.g. SiN etc.) by CVD (Chemical Vapor Deposition). After completing the temperature calibration, the heat treatment apparatus need not always be used for the film-deposition.

Also, the heater may not necessarily be divided into a plurality of heater elements. The number of heater elements is not limited to "five". Without being limited to an object (for detecting temperatures) equipped with thermoelectric couple, the temperature-detection for the object may be carried out by using a radiation thermometer.

What is claimed is:

1. A method of calibrating a temperature-detection system of a second heat treatment apparatus among a first and the second heat treatment apparatuses each having a processing vessel, a heater that heats an object to be processed, a thermal sensor and a temperature estimator that estimates a temperature of the object based on a detection signal from the thermal sensor, said method comprising:

(a) a temperature estimator adjusting process having the steps of: heating an object for temperature measurement placed in the processing vessel of the first heat treatment apparatus by the heater and measuring a true temperature of the object; and adjusting the temperature estimators of the first and second heat treatment apparatuses based on a result of the measurement of true temperature of the object;

(b) a first heat-treatment/film-thickness measuring process including: a first heat-treatment step of heat-treating a first object for heat-treatment arranged in the processing vessel of the first heat treatment apparatus having the temperature estimator, having been adjusted in the process (a), under a designated heat-treatment condition; and a first film-thickness measuring step of measuring a film-thickness of a film formed on the first object;

(c) a second heat-treatment/film-thickness measuring process including: a second heat-treatment step of heat-treating a second object for heat-treatment arranged in the processing vessel of the second heat treatment apparatus having the temperature estimator, having been adjusted in the process (a), under a designated heat-treatment condition; and a second film-thickness measuring step of measuring a film-thickness of a film formed on the second object; and (d) an offset-value calculating process having the steps of: comparing the film-thickness of the first object measured in the first film-thickness measuring step with the film-thickness of the second object measured in the second film-thickness measuring step, and calculating an offset value for calibrating the temperature of the object estimated by the temperature estimator of the second heat treatment apparatus based on the result of the comparison.

2. The calibration method according to claim 1, wherein the offset value is calculated based on a relationship between film-thickness and temperature in the offset-value calculating process.

3. The calibration method according to claim 1, further comprising:
   (e) a third heat-treatment/film-thickness measuring process including: a third heat-treatment step of heat-treating a third object for heat-treatment arranged in the processing vessel of the second heat treatment apparatus while controlling a temperature using the offset value calculated in the offset-value calculating process; and a third film-thickness measuring step of measuring a film-thickness of a film formed on the third object; and
   (f) a process of obtaining the relationship between film-thickness and temperature based on the film-thickness on the second object measured at the second film-thickness detecting step and the film-thickness on the third object detected at the third film-thickness detecting step.

4. The calibration method according to claim 1, wherein a plurality of first objects are arranged in the processing vessel in the first heat-treatment step; and, in the second heat-treatment step, a plurality of second heat-treatment objects are arranged at the same positions as the positions in which the first objects are arranged at the first heat-treatment step.

5. The calibration method according to claim 1, further comprising:
   (e) third heat-treatment/film-thickness measuring process including: a third heat-treatment step of heat-treating the third object for heat-treatment, arranged in the processing vessel of the second heat treatment apparatus, under the designated heat-treatment condition, while controlling a temperature using the offset value calculated in the offset-value calculating process; and a third film-thickness measuring step of measuring a film-thickness of a film formed on the third object;
   (f) film-thickness comparing process of comparing the film-thickness on the third object measured at the third film-thickness measuring step with the film-thickness on the first object measured at the first film-thickness measuring step;
   (g) offset-value re-calculating process including the steps of: calculating again the offset value, which is for calibrating the temperature of the object estimated by the temperature estimator of the second heat treatment apparatus, based on the comparison in the film-thickness comparing process, if a difference determined by the comparison between the film-thickness on the third object and the film-thickness on the first object is beyond a predetermined allowable range;
   (h) process of repeating the processes (e), (f) and (g) until the difference between the film-thickness on the third object and the film-thickness on the first object becomes within the predetermined allowable range.

6. The calibration method according to claim 1, wherein:
   in the process (a), a plurality of objects for temperature measurement are arranged in the processing vessel of the first heat treatment apparatus;
   in the first heat-treatment step, a plurality of first objects are arranged at the same positions as positions where the objects for temperature measurement are arranged in the process (a), whereby films of generally equal film-thickness are formed on the first objects;
   in the second heat-treatment step, the first objects are arranged at the same positions as positions where the objects for temperature measurement are arranged in the process (a); and
   the offset value is calculated in the offset-value calculating process (d) is that ensuring that respective film-thickness of the films formed on the objects for heat-treatment when they are heat-treated under the designated condition by the second apparatus are the substantially the same as respective film-thickness of the films on the first objects measured in the first film-thickness measuring step.

7. The calibration method according to claim 1, wherein in the temperature estimator adjusting process, the true temperature of the object for temperature measurement is measured by a thermoelectric couple attached to the object for temperature measurement.

* * * * *